United States Patent [19]

Ouchi et al.

[11] Patent Number: 5,759,682
[45] Date of Patent: Jun. 2, 1998

[54] THIN FILM MAGNETIC RECORDING MEDIUM

[75] Inventors: Kazuhiro Ouchi; Naoki Honda, both of Akita, Japan

[73] Assignee: Governor of Akita Perfecture, Akita-Ken, Japan

[21] Appl. No.: 613,042

[22] Filed: Mar. 8, 1996

[30] Foreign Application Priority Data

Mar. 27, 1995 [JP] Japan ................. 7-067705

[51] Int. Cl.$^6$ ........................... G11B 5/66
[52] U.S. Cl. ............ 428/332; 428/336; 428/684 T; 428/684 TS; 428/900; 204/192.2
[58] Field of Search ............. 428/684 T, 684 TS, 428/900, 332, 336; 204/192.2

[56] References Cited

U.S. PATENT DOCUMENTS

| | | | |
|---|---|---|---|
| 4,743,481 | 5/1988 | Asade | 428/213 |
| 5,082,750 | 1/1992 | Morichika | 428/694 TS |
| 5,552,217 | 9/1996 | Yamaguchi | 428/332 |

FOREIGN PATENT DOCUMENTS

| | | |
|---|---|---|
| 62-234237 | 10/1987 | Japan . |
| 63-119017 | 5/1988 | Japan . |
| 3102615 | 4/1991 | Japan . |

OTHER PUBLICATIONS

N. Watanabe, et al., IEEE Transactions on Magnetics, vol. 21, No. 5, pp. 1368–1370 (1985).

*Primary Examiner*—Leszek Kiliman
*Attorney, Agent, or Firm*—John P. White; Cooper & Dunham LLP

[57] ABSTRACT

A thin film magnetic recording medium comprising, a substrate, a crystal orientation enhancement underlayer of hcp structure formed on the substrate, a perpendicular orientation dispersion angle of c-axis thereof being not more than 10 degrees, and a cobalt-chromium-based magnetic layer formed on the underlayer, the magnetic layer having a thickness of 100 nm or less and containing 1 to 8 at % of niobium.

6 Claims, 1 Drawing Sheet

THIN FILM MAGNETIC RECORDING MEDIUM

BACKGROUND OF THE INVENTION

1. Field of the Invention

This invention relates to a thin film magnetic recording medium which can be used in a hard disk drive or a floppy disk drive for computer, or a recording device using a magnetic tape for recording voice, image or digital data. In particular, this invention relates to an improvement on the magnetic property of a sputter-deposited cobalt-chromium-based alloy thin film magnetic recording medium by the addition of a third element.

2. Description of the Related Art

A cobalt-chromium-based alloy thin film magnetic recording medium which is generally formed by sputtering has been extensively utilized in various kinds of recording devices as mentioned above. In the actual application of the thin film magnetic recording medium to these end-uses, one to five atomic percent of high purity tantalum is generally added to a cobalt-chromium alloy for the purpose of improving the magnetic properties of the alloy whether a longitudinal or a perpendicular magnetic recording medium is manufactured (R. D. Fisher, J. C. Allan and J. L. Pressesky; IEEE Trans. on Magn., vol.22, 352(1986): B. J. Langland and P. A. Albert; IEEE Trans. on Magn., vol.17, 2547(1981); and M. Naoe, M. Matsuoka and Y. Hoshi; J. of Appl. Phys., vol.57, 4019(1985)). However, the purification of tantalum through the separation from niobium is very difficult so that high purity tantalum is very expensive, thus inviting an increase in product cost of the Co—Cr—Ta-based thin film magnetic recording medium.

Meanwhile, there is also known a thin film magnetic recording medium wherein not less than 5 at % of niobium is added to a cobalt-chromium alloy (N. Watanabe, Y. Ishizuka, K. Kimura and E. Imaoka; IEEE Trans. on Magn., vol.21, 1368(1985)). According to the article mentioned above, it is reported that when a Co—Cr—Nb thin film is directly deposited on a polyimide substrate by sputtering, an initial layer having a low coercivity of only 100 Oe or less is formed on the substrate in a thickness of about 50 nm, so that it is impossible to obtain a recording medium of high coercivity if the thickness of the film is 100 nm or less. As seen from this report, it has been impossible, in the case of the conventional Co—Cr—Nb thin film magnetic recording medium, to achieve an improvement of magnetic property or to attain a high output by the addition of Nb because an initial layer of low coercivity, which may presumable have a poor crystal orientation, is formed in the initial step of sputtering.

SUMMARY OF THE INVENTION

Accordingly, an object of the present invention is to provide a Co—Cr—Nb-based thin film magnetic recording medium having an excellent magnetic property which is comparable to or higher than that of the conventional Co—Cr—Ta-based thin film magnetic recording medium.

Namely, according to the first aspect of the present invention, there is provided a thin film magnetic recording medium comprising a substrate having an upper surface subjected to reverse-sputtering; and a cobalt-chromium-based magnetic layer formed on the upper surface of the substrate by sputtering, the magnetic layer having a film thickness of 100 nm or less and containing 1 to 8 at % of niobium.

According to the second aspect of the present invention, there is provided a thin film magnetic recording medium comprising a substrate; a crystal orientation enhancement underlayer having an hcp structure formed on the substrate, a perpendicular orientation dispersion angle of c-axis thereof being not more than 10 degrees; and a cobalt-chromium-based magnetic layer formed on the underlayer, the magnetic layer having a thickness of 100 nm or less and containing 1 to 8 at % of niobium.

DETAILED DESCRIPTION OF THE PREFERRED EMBODIMENT

Figure 1:
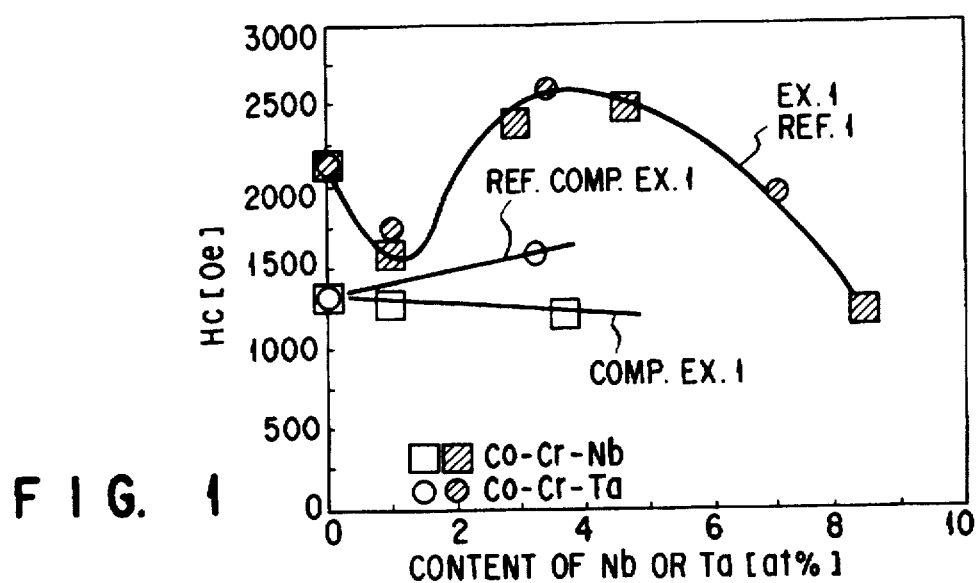
FIG. 1 is a graph illustrating a relationship between the content of a third component (Nb or Ta) in a magnetic recording layer and the coercivity in the direction perpendicular to the film surface of the magnetic recording layer in each of the magnetic recording layers obtained in Example 1, Comparative Example 1, Reference Example 1 and Referential Comparative Example 1.

A substrate whose upper surface is subjected to reverse-sputtering and cleaned in the first aspect of the invention as well as a crystal orientation enhancement underlayer having an hcp structure whose perpendicular orientation dispersion angle of c-axis is not more than 10 degrees in the second aspect of the invention are effective in improving the crystal orientation of a Co—Cr—Nb thin film to be deposited thereon by sputtering. It is also possible, in the second aspect of the invention, to employ a substrate whose upper surface is subjected to reverse-sputtering. If a substrate surface-treated by reverse-sputtering is employed in the second aspect of this invention, the crystal orientation of the crystal orientation enhancement underlayer will be also improved, and hence it would be advantageous in improving the crystal orientation of a Co—Cr—Nb thin film to be deposited thereon by sputtering.

The reverse-sputtering according to this invention should preferably be performed for a duration of at least 300 seconds, more preferably at least 600 seconds under ordinary conditions, e.g., a pressure of 1 Pa in Ar and a power of 500 W. If the duration of reverse-sputtering is too short, the upper surface of the substrate can not be sufficiently conditioned for improving the crystal orientation of the thin film to be deposited thereon.

As a material for the crystal orientation enhancement underlayer in the second aspect of this invention, titanium or titanium-chromium alloy may be employed. The perpendicular orientation dispersion angle of c-axis of the crystal orientation enhancement underlayer is a criterion of the degree of crystal orientation of the underlayer itself. If this angle exceeds 10 degrees, the effect of the underlayer to improve the crystal orientation of the Co—Cr—Nb thin film to be sputter-deposited thereon would become insufficient.

Moreover, the perpendicular orientation dispersion angle of c-axis of the underlayer should preferably be 7 degrees or less, more preferably 5 degrees or less.

The thickness of the magnetic recording layer according to the present invention should preferably be 100 nm or less, more preferably in the range of 50 to 100 nm. The reason for setting the content of Nb in the Co—Cr—Nb thin film constituting the magnetic recording layer to not more than 8 at % is that, if the content of Nb exceeds 8 at %, it is difficult to obtain a high coercivity. A more preferable range of the content of Nb in the Co—Cr—Nb thin film is 2 to 5 at %.

When a substrate whose upper surface is subjected to reverse-sputtering or a crystal orientation enhancement underlayer having an hcp structure whose perpendicular orientation dispersion angle of c-axis is not more than 10 degrees is employed as in the present invention, it is possible to obtain a magnetic recording medium excellent in magnetic property because the crystal orientation of the Co—Cr—Nb thin film to be sputter-deposited thereon would be excellent from the beginning of its crystal growth.

This invention will be further explained with reference to the following examples.

Example 1

A dc magnetron sputtering apparatus (SPF-540H, trade name of Nichiden Anelva Co.) was employed, and a reinforced glass disk substrate (Asahi Glass Co.) and a target were placed in the sputtering apparatus. The target employed was made of a cobalt-chromium alloy (10 cm in diameter) containing 19 at % chromium and niobium pellets disposed on the alloy. The content of Nb (niobium) in a Co—Cr—Nb thin film to be sputter-deposited was adjusted by varying the number of the niobium pellets.

The surface treatment of the substrate was carried out for 10 minutes while applying radio frequency voltage to the substrate under the conditions of a pressure of 1 Pa in Ar and a power of 500 W, thereby effecting reverse-sputtering of the substrate. Then, the temperature of the substrate was set to 150° C., and the target was sputtered to form a Co—Cr—Nb thin film 100 nm in thickness on the substrate.

Comparative Example 1

The same procedure as described in Example 1 was repeated except that the reverse-sputtering of the substrate was not performed, thereby forming a Co—Cr—Nb thin film 100 nm in thickness on the substrate.

Reference Example 1

The same procedure as described in Example 1 was repeated except that a target made of a cobalt-chromium alloy (10 cm in diameter) containing 19 at % of chromium and tantalum pellets disposed on the alloy was employed, thereby forming a Co—Cr—Ta thin film 100 nm in thickness on the substrate.

Referential Comparative Example 1

The same procedure as described in Reference Example 1 was repeated except that the reverse-sputtering of the substrate was not performed, thereby forming a Co—Cr—Ta thin film 100 nm in thickness on the substrate.

Measurements regarding the coercivity in a direction perpendicular to the surface of a magnetic recording layer were performed on each of the magnetic recording layers obtained in Example 1, Comparative Example 1, Reference Example 1 and Referential Comparative Example 1 by using a vibrating sample magnetometer. FIG. 1 illustrates a relationship between the content of a third component (Nb or Ta) in a magnetic recording layer and the coercivity in a direction perpendicular to the surface of the magnetic recording layer. As seen from the comparison between Example 1 and Comparative Example 1 in FIG. 1, when the content of Nb in the Co—Cr—Nb thin film was not more than 8 at %, the magnetic recording layer deposited on a substrate which was subjected in advance to reverse-sputtering (Example 1) exhibited a higher perpendicular coercivity than that deposited on a substrate which was not subjected to reverse-sputtering (Comparative Example 1). Further, as seen from the comparison between Example 1 and Reference Example 1 in FIG. 1, the coercivity of the Co—Cr—Nb thin film according to this invention (Example 1) was almost comparable to that of the conventional Co—Cr—Ta thin film (Reference Example 1).

Example 2

The same dc magnetron sputtering apparatus used in Example 1 was employed. In addition to the reinforced glass disk substrate (Asahi Glass Co.) and the target that were employed in Example 1, a titanium target for a crystal orientation enhancement underlayer was also placed in the magnetron sputtering apparatus. A target made of a cobalt-chromium alloy (10 cm in diameter) containing 19 at % chromium and niobium pellets disposed on the alloy was also employed in this case, and the content of Nb (niobium) in a Co—Cr—Nb thin film to be sputter-deposited was adjusted by varying the number of the niobium pellets.

The surface treatment of the substrate was carried out while applying radio frequency voltage to the substrate under the conditions of a pressure of 1 Pa in Ar and a power of 500 W, thereby effecting reverse sputtering of the substrate. Then, the temperature of the substrate was kept at room temperature, and the titanium target was sputtered to form a crystal orientation enhancement underlayer 70 nm in thickness. Thereafter, the alloy target was sputtered to form a Co—Cr—Nb thin film 100 nm in thickness on the underlayer on the substrate.

Reference Example 2

The same procedure as described in Example 2 was repeated except that a target made of a cobalt-chromium alloy (10 cm in diameter) containing 19 at % of chromium and tantalum pellets disposed on the alloy was employed, thereby forming a Co—Cr—Ta thin film 100 nm in thickness on the underlayer on the substrate.

Figure 2:
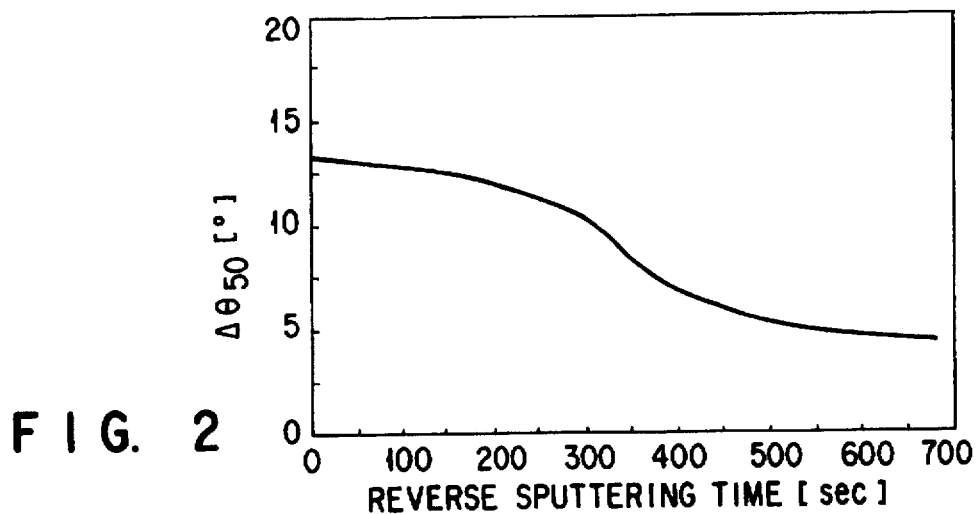
FIG. 2 is a graph illustrating a relationship between the duration of reverse-sputtering and the perpendicular orientation dispersion angle of c-axis of the crystal orientation enhancement underlayer (Ti) in each of the magnetic recording layers obtained in Example 2 and Reference Example 2.

At first, the duration of reverse-sputtering of the substrate was variously altered to measure changes in perpendicular orientation dispersion angle of the c-axis of hcp crystal of the crystal orientation enhancement underlayer (Ti) formed on the substrate in order to investigate the influence of the duration of reverse-sputtering on the perpendicular orientation dispersion angle of the c-axis. FIG. 2 illustrates a relationship between the duration of reverse-sputtering and a perpendicular orientation dispersion angle of c-axis ($\Delta\theta_{50}$), measured on the basis of a full width at half maximum of locking curve of (002) plane by X-ray diffraction. As apparent from FIG. 2, the duration of reverse-sputtering is required to be set to at least 300 seconds in order to control the perpendicular orientation dispersion angle of c-axis of a crystal orientation enhancement underlayer to not more than 10 degrees.

In the followings, examples wherein the duration of the reverse-sputtering on the substrate was set to 600 seconds (10 minutes) will be explained.

Figure 3:
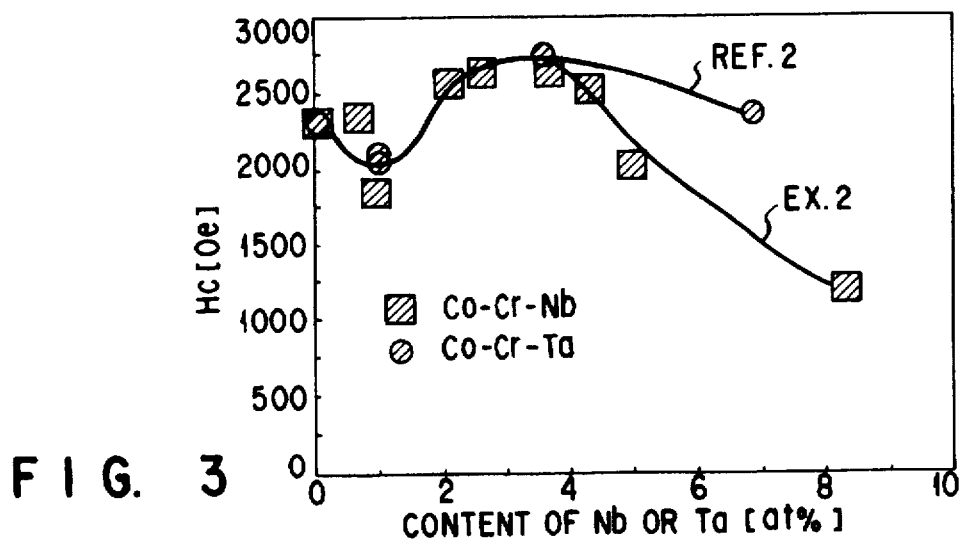
FIG. 3 is a graph illustrating a relationship between the content of a third component (Nb or Ta) in a magnetic recording layer and the coercivity in the direction perpendicular to the film surface of the magnetic recording layer in each of the magnetic recording layers obtained in Example 2 and Reference Example 2.

The coercivity in a direction perpendicular to the surface of magnetic recording layer was measured on each of the magnetic recording layers obtained in Example 2 and Reference Example 2 by using a vibrating sample magnetometer. FIG. 3 illustrates a relationship between the content of a third component (Nb or Ta) in a magnetic recording layer and the coercivity in a direction perpendicular to the surface of the magnetic recording layer.

As seen from the comparison between Example 2 and Reference Example 2 in FIG. 3, the coercivity of the Co—Cr—Nb thin film according to this invention (Example 2) was almost comparable to that of the conventional Co—Cr—Ta thin film (Reference Example 2). In particular, if the content of the third component was not more than 4 at %, there was substantially no difference in coercivity between both of them.

Further, as for samples that indicated a high saturation magnetization (Ms) of 600 kA/m or more among aforementioned magnetic recording layers, the values of the perpendicular coercivity are shown in Table 1 below. As seen from Table 1, the Co—Cr—Nb thin films indicated a higher perpendicular coercivity than the conventional Co—Cr—Ta thin film.

TABLE 1

| Samples | Hc [Oe] | Ms [kA/m] |
|---|---|---|
| Co—Cr—Nb$_{3.7}$ | 2650 | 690 |
| Co—Cr—Nb$_{2.5}$ | 2630 | 620 |
| Co—Cr—Ta$_1$ | 2060 | 640 |

Besides the above embodiments, this invention will be also applicable to a longitudinal magnetic recording medium where the c-axis of hcp crystal of a magnetic recording layer is orientated in-plane direction, provided that a material having a bcc structure whose <100> axis is perpendicularly orientated is employed as a crystal orientation enhancement underlayer. Examples of such a material are chromium, molybdenum and chromium-titanium alloys. This invention will be also applicable to a so-called composite film medium having a magnetic film of high permeability such as permalloy film interposed between a crystal orientation enhancement underlayer and a Co—Cr—Nb film (S. Iwasaki, Y. Nakamura and K. Ouchi; IEEE Trans. on Magn., vol.15, 1456(1979)).

As explained above, it is possible according to this invention to provide a thin film magnetic recording medium comprising a Co—Cr—Nb-based magnetic recording layer having such a high coercivity and a high saturation magnetization that the prior art has failed to achieve up to date. It is also possible according to this invention to provide a magnetic recording medium which can be manufactured at low cost due to the employment, in place of expensive tantalum, of niobium or a tantalum-niobium alloy which can be dispensed with the refinement of tantalum.

What is claimed is:

1. A thin film magnetic recording medium comprising:

a substrate having an upper surface subjected to reverse-sputtering; and a cobalt-chromium-based magnetic layer formed on the upper surface of said substrate by sputtering, said magnetic layer having a thickness of 100 nm or less and containing 2 to 5 at % of niobium.

2. The thin film magnetic recording medium according to claim 1, wherein said magnetic layer has a thickness ranging from 50 to 100 nm.

3. A thin film magnetic recording medium comprising:

a substrate;

a crystal orientation enhancement underlayer having an hop structure formed on said substrate, a perpendicular orientation dispersion angle of c-axis thereof being not more than 7 degrees; and a cobalt-chromium-based magnetic layer formed on said underlayer, said magnetic layer having a thickness of 100 nm or less and containing 2 to 5 at % of niobium.

4. The thin film magnetic recording medium according to claim 3, wherein said magnetic layer has a thickness ranging from 50 to 100 nm.

5. The thin film magnetic recording medium according to claim 3, wherein said crystal orientation enhancement underlayer is formed of titanium or a titanium-chromium alloy.

6. The thin film magnetic recording medium according to claim 3, wherein said substrate is subjected to reverse-sputtering.

* * * * *